United States Patent Office 3,486,264
Patented Dec. 30, 1969

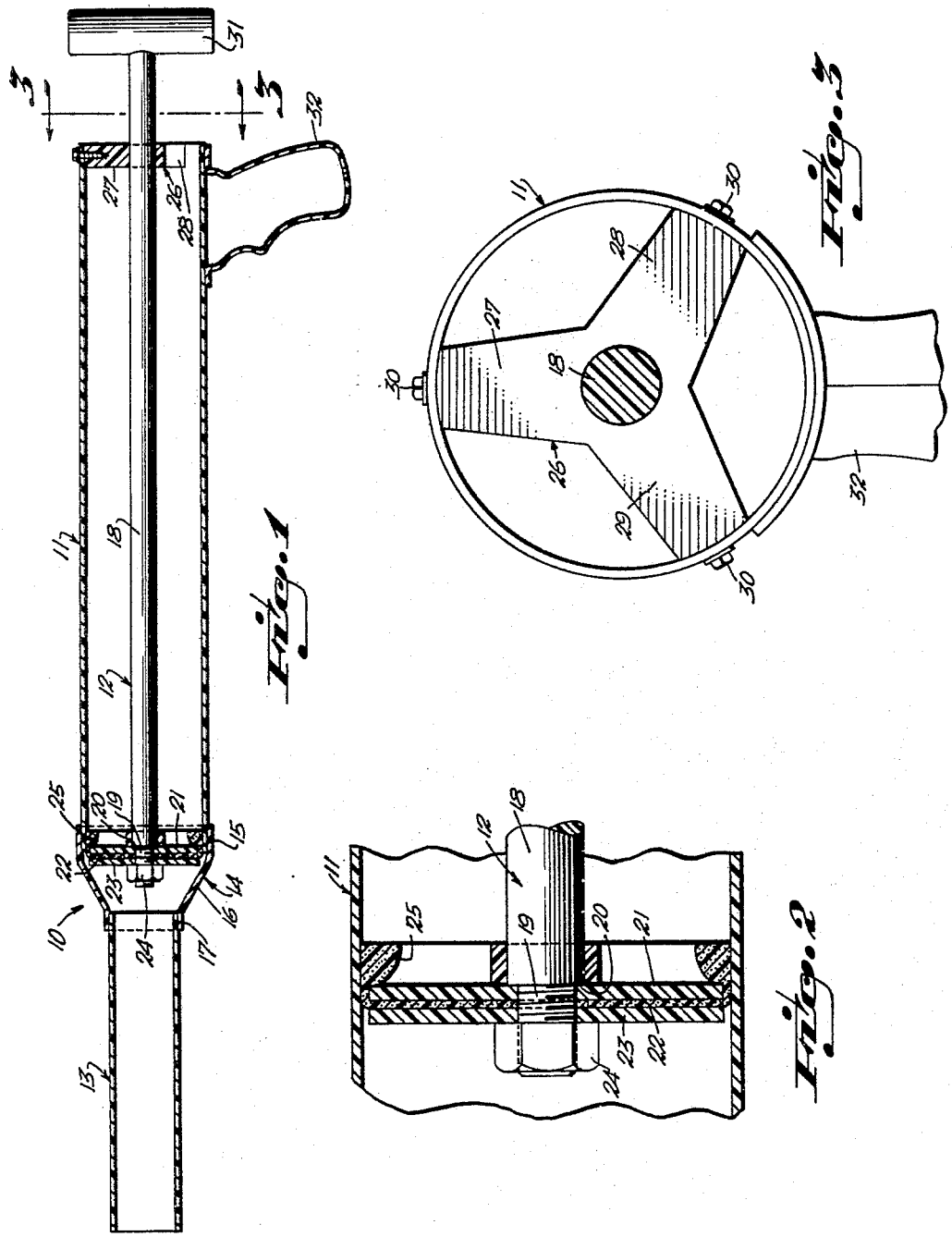

3,486,264
TROPICAL FISH CATCHER
Bruce Mounier and Louis Lombard, Miami, Fla.; said Mounier assignor to Lou Lombard, Inc., a corporation of Florida
Filed Nov. 8, 1968, Ser. No. 774,296
Int. Cl. A01k 77/00
U.S. Cl. 43—4           5 Claims

ABSTRACT OF THE DISCLOSURE

A suction type fish catcher having a manually-actuated piston movable in a cylindrical piston barrel by means of a piston rod extending through the rear end of the barrel for sucking in water at the front end together with fish to be caught. The front end of the piston barrel extends into a reduced-diameter entrance tube through a frusto-conical reducing union. A spider bushing at the rear end of the piston barrel permits free through flow of water during movement of the piston in either direction in the barrel.

---

This invention relates to fishing and is directed particularly to an improved suction type fish catcher for capturing alive and without injury small tropical fish for use in aquariums.

Various devices for capturing small fish without harming them have been devised, principal among which are those of the type having a spring-pressed piston in a barrel open at one end for sucking in water upon backward movement of the piston under the force of the spring when released by trigger mechanism. The tropical fish in front of the device opening are drawn into the barrel with the water, after which they can readily be discharged into a suitable container for transport to the aquarium. The principal difficulty with such spring-actuated suction type fish catchers has been their tendency to harm the delicate fish particularly about the gills due to the forceful water pressures exerted by the inrushing or sucked-in water carrying the fish into the interior of the barrel.

It is accordingly the principal object of this invention to provide a new and improved suction type tropical fish catcher which obviates the above-described deficiency of spring-actuated piston mechanisms by the provision of a manually-controlled piston by means of which full control can be exercised over suction pressure, thereby enabling the operator to subject the fish being caught to no greater suction pressure than will be necessary to draw them into the catcher barrel, and thereby minimizing the possibility of harming the fish.

A more particular object of the invention is to provide a suction type tropical fish catcher of the character described wherein, for better aiming and control of the device, the rear end of the piston barrel is provided with a downwardly-extending handle in a form of a piston gun grip for gripping with one hand while the other hand controls piston movement by pulling or pushing upon a handle at the outer end of a rearwardly-extending piston rod.

Still another object is to provide a tropical fish catcher of the character described which will be simple in construction, which will be highly resistant to the damaging or corrosive effects of fresh or sea water, and which will be dependable and long-wearing in use.

Other objects, features and advantages of the invention will be apparent from the following description when read with reference to the accompanying drawings. In the drawings, wherein like reference numerals denote the corresponding parts throughout the several views:

FIG. 1 is a longitudinal cross-sectional view of a tropical fish catcher embodying the invention;

FIG. 2 is a fragmentary view, on an enlarged scale, of the piston assembly, also shown in cross-section; and FIG. 3 is a vertical cross-sectional view taken along the line 3—3 of FIG. 1 in the direction of the arrows.

Referring now in detail to the drawings, reference numeral 10 designates, generally, a suction fish catcher embodying the invention, the same being comprised of a suction cylinder or barrel 11, a piston 12 and an entrance tube 13. The cylinder 11, as well as the entrance tube 13 are fabricated of lengths of clear plastic tubing, such as of clear cellulose acetate butyrate, the diameter of the entrance tube 13 being substantially smaller than that of the cylinder 11. The inner ends of the cylinder 11 and the entrance tube 13 are coaxially joined by means of a reducing union 14, also of clear plastic, said union having a first tubular portion 15, the inner diameter of which is substantially the same as the outer diameter of said cylinder, a frusto-conical central portion 16, and a second tubular portion 17, the inner diameter of which is substantially the same as the outer diameter of the entrance tube 13. The inner ends of the cylinder 11 and the entrance tube 13 are secured, as by cementing, within respective tubular ends 15 and 17 of the reducing union 14.

The piston 12 comprises a piston rod 18, the inner end of which is formed with an externally-threaded reduced-diameter portion 19 defining an annular shoulder 20. Seated against the shoulder 20 is a centrally-apertured disc 21, against the outside of which there is arranged a centrally-apertured flexible cup washer 22 secured in place by a centrally-apertured outer disc 23, the assembly being retained in place by a nut 24, preferably of stainless steel threaded on the externally-threaded outer end portion 19. The flexible cup washer 22, which is preferably of foam rubber, extends rearwardly over the outer periphery of the inner disc 21, said disc being of such external diameter and the thickness of said cup washer being such as to provide for a snug sliding fit of the rearwardly directed skirt portion 25 of said cup washer in the cylinder 11.

The piston rod 18 is constrained and guided in its axial movement within the barrel 11 by a centrally-apertured, three-legged spider 26 having legs 27, 28 and 29, the outer ends of which are secured with respect to said barrel, at the rear end thereof, as by screws 30. The outer end of the piston rod 18 is fitted with a handle 31, and the barrel 11 has cemented or otherwise secured thereto near the rear end thereof a pistol type hand grip 32.

In use, the entrance tube 13 of the device will be placed close to the fish or fishes to be caught, aiming readily being accomplished by holding the pistol grip 32 with one hand while gripping the piston rod handle 31 with the other hand. The piston will preferably be pushed forward to project a current of water in front of the entrance tube, to which the fish will react by aligning with and swimming in the direction of the entrance tube opening. Thereafter, it is a simple matter to slowly withdraw the piston to suck the fish through the entrance tube and into the barrel 11. Ejection of the caught fish is readily accomplished by pushing the piston forward again. In this connection, it is to be noted that the frusto-conical central portion of the reducing union 14 provides a gradual transition zone between the large diameter barrel 11 and the comparatively small diameter entrance tube 13, thereby minimizing the possibility of damage to the caught fish in the operation or removing it from the fish catcher. It will also be noted that the size and configuration of the spider 26 is such as to minimize obstruction to water flow in and out of the rear end of the barrel 11 during movement of the piston 12. Thus, rapid movements of the piston either in the inward or the outward direction can readily be effected, when required, without difficulty.

Important advantages of the invention reside in its simplicity, accuracy, and ease of its control in use. Additionally, the piston assembly is so constructed as to be readily dissembled for repair or replacement of any of the parts such as, for example, the replacement of the cup washer 22.

An important feature of the invention resides in the fact that the gradual transitional change in diameters between the entrance tube 13 and the barrel 11 afforded by the reducing union 14 substantially eliminates such water turbulence in this zone upon actuation of the device as might otherwise occur to injure small fish in their passage therethrough.

The device is also readily adapted to manufacture of a strong, clear synthetic plastic, such as cellulose acetate butyrate, for long life and dependable operation.

While we have illustrated and described herein only one form in which the invention can conveniently be embodied in practice, it is to be understood that this form is presented by way of example only and not in a limiting sense.

What we claim is new and desire to secure by Letters Patent is:

1. A fish catcher comprising in combination a tubular barrel, a piston slidably received in said barrel, said piston having a piston rod extending through the rear end of said barrel, means at the rear end of said barrel for slidably journalling said piston rod, a handle at the outer end of said piston rod, a tubular entrance tube of lesser diameter than that of said barrel coaxially arranged in front of the front end of said barrel, a frusto-conical reducing union member interjoining the facing ends of said barrel and said entrance tube, and a hand grip member affixed to said barrel near the rear end thereof.

2. A tropical fish catcher as defined in claim 1, wherein said piston rod journalling means comprises a three-legged spider member fixed within said barrel at the rear end thereof and having a central aperture in which said piston rod is slidingly received.

3. A tropical fish catcher as defined in claim 1 wherein said barrel, said reducing union member and said entrance tube are all of a clear synthetic plastic material.

4. A tropical fish catcher as defined in claim 3 wherein said hand grip member is in the form of a pistol grip.

5. A tropical fish catcher as defined in claim 4 wherein said piston comprises a flexible cup washer fitted between a pair of apertured discs secured to the inner end of said rod, the outer diameter of one of said discs being lesser than the inner diameter of said barrel and an outer peripheral portion of said cup washer extending around the peripheral edge of said one disc.

References Cited

UNITED STATES PATENTS

| | | | |
|---|---|---|---|
| 3,018,579 | 1/1962 | Girden | 43—4 |
| 3,184,878 | 5/1965 | Seene | 43—4 |
| 3,231,997 | 2/1966 | Shugarman | 43—4 |

WARNER H. CAMP, Primary Examiner